United States Patent [19]

Rothamel et al.

[11] Patent Number: 5,591,909
[45] Date of Patent: Jan. 7, 1997

[54] METHOD AND DEVICE FOR BALANCING AN UNBALANCE ON A MOTOR VEHICLE WHEEL

[75] Inventors: Karl Rothamel, Seeheim-Jugenheim; Kurt Humber, Griesheim; Ulrich Diez, Reichshof, all of Germany

[73] Assignee: Hofmann Werkstatt-Technik GmbH, Germany

[21] Appl. No.: 435,153

[22] Filed: May 5, 1995

[30] Foreign Application Priority Data

May 5, 1994 [DE] Germany ............... 44 15 931.5

[51] Int. Cl.⁶ ............................................. G01M 1/38
[52] U.S. Cl. ..................... 73/462; 73/470; 301/5.21
[58] Field of Search ................ 73/462, 468, 470; 301/5.21, 5.22

[56] References Cited

U.S. PATENT DOCUMENTS

| | | | |
|---|---|---|---|
| 3,854,339 | 12/1974 | Muller | 73/464 |
| 4,300,803 | 11/1981 | Chorosevic | 73/470 |
| 4,759,217 | 7/1988 | Brihier et al. | 73/462 |
| 4,854,168 | 8/1989 | Himmler | 73/459 |
| 4,926,341 | 5/1990 | Guyot | 73/462 |
| 5,350,220 | 9/1994 | Atwell | 301/5.21 |
| 5,355,729 | 10/1994 | Douglas | 73/462 |

FOREIGN PATENT DOCUMENTS

| | | |
|---|---|---|
| 0417414A2 | 3/1991 | European Pat. Off. . |
| 0454393A2 | 10/1991 | European Pat. Off. . |
| 2019649 | 11/1971 | Germany . |
| 2522149 | 11/1976 | Germany . |
| 2830070 | 1/1980 | Germany . |
| 3743302A1 | 6/1989 | Germany . |
| 4107950A1 | 9/1992 | Germany . |
| 4229865A1 | 3/1994 | Germany . |

OTHER PUBLICATIONS

Geodyna 3000/3500, Hofmann Werkstatt-Technik GmbH, 1994.
Patent Abstracts of Japan, vol. 18, No. 64 (P-1685) Feb. 2, 1994.

Primary Examiner—John E. Chapman
Attorney, Agent, or Firm—Cushman Darby & Cushman Intellectual Property Group of Pillsbury Madison & Sutro L.L.P.

[57] ABSTRACT

A method and device for balancing an unbalance on a motor vehicle wheel, including a tire mounting portion that is provided with a stylized design. Such a wheel can include a supporting disk with openings therein defining radially extending, spaced apart support members, such as struts or spokes, in the main area of the wheel. In particular such a tire supporting disk can comprise light metal. The angular positions of the radially extending support members are determined and are stored in storage 2 and the measurement values determined in the measurement procedure are divided into balancing corresponding to the angular positions of the radially extending support members. Weights for balancing the wheel are determined and are attached to the supporting disk at angular positions corresponding to the locations of the support members.

6 Claims, 1 Drawing Sheet

METHOD AND DEVICE FOR BALANCING AN UNBALANCE ON A MOTOR VEHICLE WHEEL

FIELD OF THE INVENTION

The invention relates to a method for balancing a disk type wheel having spaced apart supports and a device to carry out that balancing technique.

BACKGROUND OF THE INVENTION

Reference is made to DE 42 29 865 A and to a prospectus on the "Geodyna 3000/3500" of Hofmann Werkstatt-Technik GmbH, 64319 Pfungstadt, publication 9402195 3/94.

For wheel disks which have no rim flanges for attaching balancing weights, self-adhesive balancing weights can be used. Such adhesively-applied balancing weights can be kept at hand in certain sizes in the shape of bands or bars in predetermined weight levels, and can be attached on the inner side of the wheel disk where they remain pressed on by centrifugal force while driving. Through these means, it is further guaranteed that the outer appearance of the wheel disk is not impaired by the balancing weight. A published German application, DE 42 29 865 A1, discloses sampling the balancing planes and radii, in which balancing weights can be positioned (particularly on the inner side of the wheel disk) to balance an unbalance. The balancing positions (which can also lie at the covered positions) are relocated with the help of the sampling device after conducting the measurement process.

From a published Japanese application, JP 59-72036 A, published in Patent Abstracts of Japan P-295, Aug. 17, 1994, Vol. 8/No. 179, it is known, for rotors which permit balancing only at certain balancing points, to divide the unbalance vector into two components which lie within the allowed balancing points. It is also known from another published German application, DE 28 30 070 A1, to divide the unbalance vector determined in a measurement procedure into components.

Wheel disks for motor vehicle wheels, on the other hand, are designed, particularly on their inside, such that balancing weights, in particular adhesive weights, can be attached at all angular positions. For the measurement device disclosed in the prospectus "Geodyna 3000/3500", mentioned above, infinitely many locations for weight placement are possible.

For balancing an unbalance, it is known from German application DE 37 43 302 A1 to keep balancing masses at the ready. Furthermore, German patent DE-OS 20 19 649 discloses the balancing masses kept at hand in the form of a continuous band of weight material formed into a roll from which the required weight sizes are cut.

SUMMARY OF THE PRESENT INVENTION

The task of the present invention is to create a method and a device of the type noted above, with which the balancing of an unbalance is achieved on the protected points of the motor vehicle wheel.

This problem is solved for the method of the present invention by determining the amount of the balancing mass required to correct any sensed unbalance, determining the angular location of the stylized wheel disk parts, such as spokes, webs or struts, dividing the balancing weight into masses and adjusting the angular position of the divided balancing mass to angular positions corresponding to the location of the parts of the wheel disk so that the sensed unbalance can be corrected. The balancing weights determined for the balancing components can be kept at the ready in the form of bands (bars) in graduated weight sizes. To maintain a high balancing quality, that is to say, minimized residual unbalance, the weight levels are likewise stored and taken into account in determining the balancing components at the points of the radially continuous wheel disk parts, such as webs or spokes.

In a preferred embodiment, the balancing weights are kept at the ready in the form of a continuous band of weight material in a rolled form. The desired balancing mass, for the necessary balancing weights to be attached, can be cut from the band. Since variable balancing weights desired in each case may be cut from the weight band, a high quality of balancing is achieved. By attaching the balancing weights to the inside of the wheel disk, the balancing weights are protected from the outside by the continuous web or spokes of the wheel disk. The invention is advantageous especially for those wheel disks that are made from light metal and which have ornamental openings in the material.

Other objects, features, and characteristics of the present invention will become apparent upon consideration of the following description in the appended claims with reference to the accompanying drawings, all of which form a part of the specification, and wherein referenced numerals designate corresponding parts in the various figures.

BRIEF DESCRIPTION OF THE DRAWINGS

The invention is explained in detail with the help of an exemplary embodiment depicted in the figures.

DETAILED DESCRIPTION OF THE PREFERRED EMBODIMENT

Figure 1:
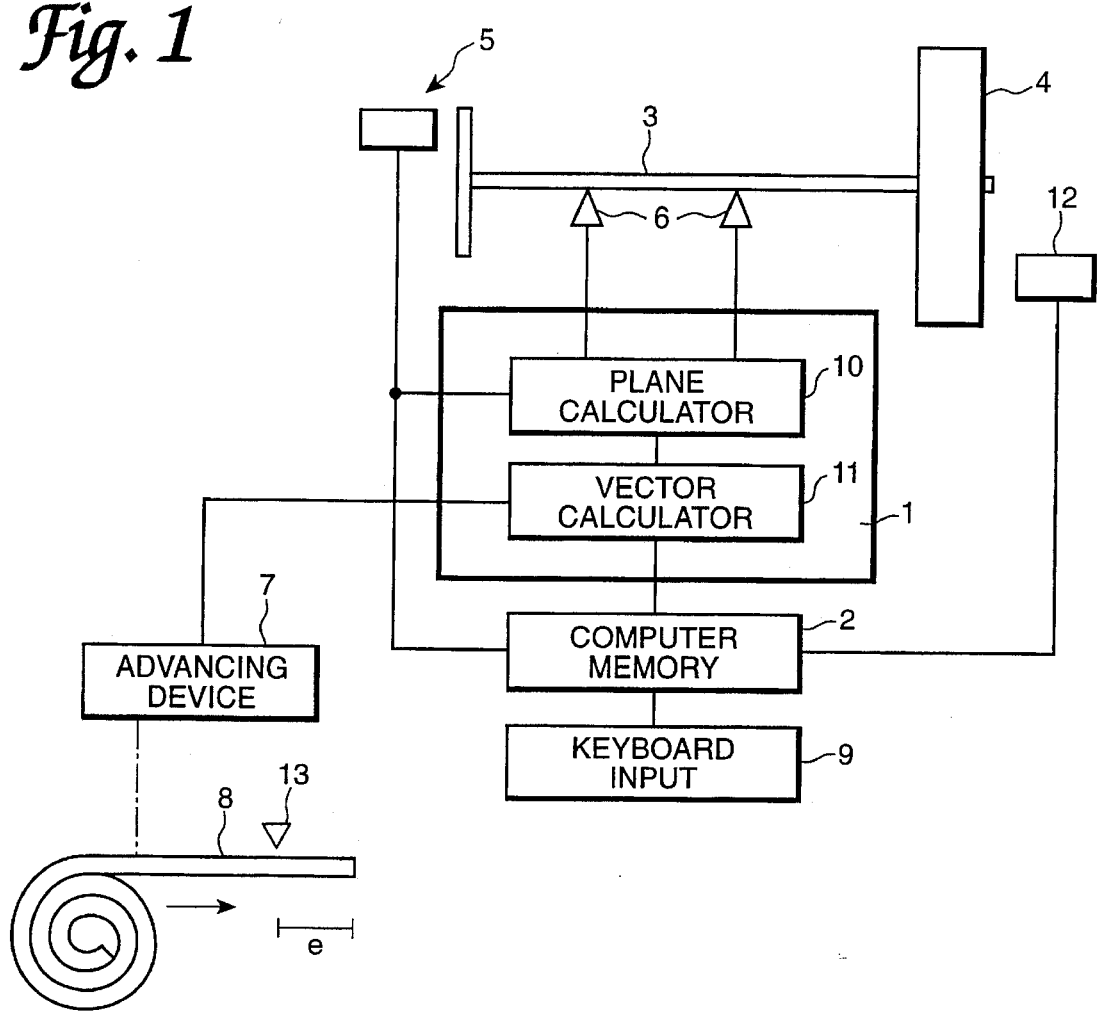
FIG. 1 shows a block diagram for a device according to the present invention.

In FIG. 1, a device for balancing an unbalance on a motor vehicle wheel is schematically depicted.

The device has, as is typically provided in a balancing machine with an unbalance measuring device, a conventionally driven main shaft 3 on which a motor vehicle wheel 4 to be balanced is fixed. In frictional connection with the main shaft 3, force measurement devices 6 are situated in the form of a force measurement transducer. Further, an angle measuring device 5 is provided adjacent the main shaft, preferably in the form of an angle increment meter, i.e., a non-tactile (optical, electrical, magnetic) scanning disk.

The force measurement device 6 and the angle measurement device 5 are connected with and provide input signals to a plane calculator 10, which is part of an evaluation circuit 1. Depending on wheel dimensions, in particular depending on the balancing radii and balancing planes in which balancing weights can be attached, the plane calculator 10 calculates a correcting balancing mass which, when attached in a balancing plane on the motor vehicle wheel, will statically balance an unbalance determined from the data delivered by the force measurement device 6 and which was combined with the angular data from the angle measurement device 5. When dynamic balancing is desired, the plane calculator determines the balancing masses in both inside and outside balancing planes with the balancing masses attached on the wheel at the prescribed balancing radii.

In the evaluation circuit 1, a vector calculator 11 is connected to the plane calculator 10. The vector calculator 11 is connected with a storage device 2 for storing angular positions corresponding to the radially extending, spaced apart wheel disk parts. Those wheel disk parts can be in the form of webs, spokes or similar forms. The angular data for the radially-extending, spaced-apart wheel disk parts can be scanned with the help of a scanning device 12 adjacent the motor vehicle wheel attached on the main shaft 3, so that a consistent reference can be made to the data of the angle measurement device 5 during the unbalance measurement procedure, as well as during the later balancing procedure.

The vector calculator 11 divides the balancing values (balancing masses and the balancing angles), determined in the plane calculator 10, into balancing components in such angular positions which, as noted above, correspond to the location of continuous wheel disk parts in the form of webs, spokes and similar forms on the motor vehicle wheel 4.

The vector calculator 11 is connected with an advancing device 7. The advancing device 7 serves to advance a weight band 8, from which a balancing weight can be severed, i.e., by means of a cutting device 13, depending on balancing masses determined for each of the balancing components by the vector calculator 11. The weight band 8 can, for example, be kept at the ready in the form of a continuous weight band, similarly to that described in DE-OS 25 22 149. The weight band 8 can be stored in roll form as shown in FIG. 1. From this continuous weight band, a certain variable length l can be severed depending on the determined balancing weight which corresponds to the desired balancing mass. It is, however, possible to keep the balancing weights at the ready as a band in given graduated weights, i.e., as is known from DE-GM 17 77 597 or U.S. Pat. No. 2,640,727. The graduated weights are then taken into consideration in the calculation of the balancing components in the vector calculator 11 to achieve optimal balancing quality.

It is also possible to provide a keyboard 9 connected to computer memory 2. The angular positions of the radially continuous wheel disk parts of various wheel disk types are stored in the computer memory 2.

Figure 2:
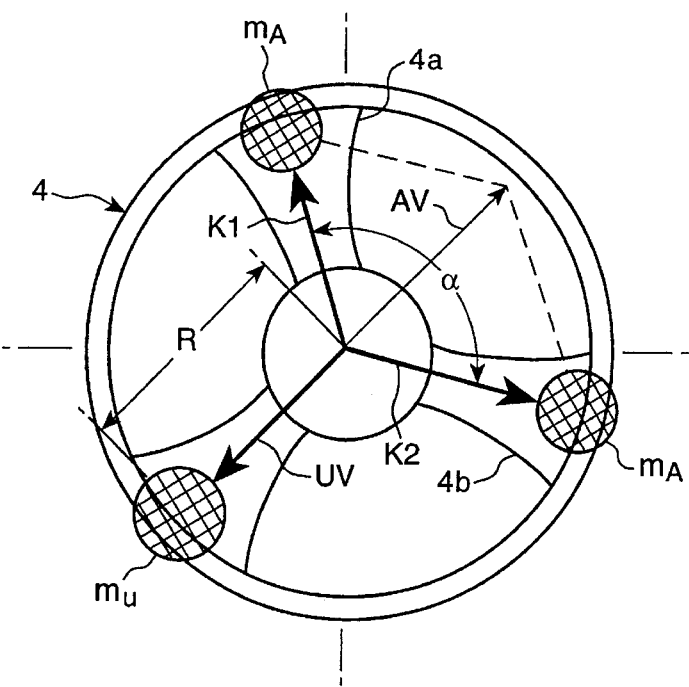
FIG. 2 shows a vector diagram to illustrate the working manner of the device in FIG. 1.

With the help of FIG. 2, the working method of the evaluation device 1 in connection with the memory device 2 is explained. In the plane calculator 10, an unbalance vector UV is determined from the measurement results of the force measurement device 6 and the angle measurement device 5, which is a measurement of an unbalance of the motor vehicle wheel 4 in a certain balancing plane, with reference to a certain radius. The unbalance vector corresponds to a mass Mu in a certain angular position on the radius R. This unbalance effect can be balanced by a balancing vector AV in an angular position shifted by 180° relative to a balancing mass corresponding to the mass Mu on a balancing radius R. When a radially continuous wheel disk part is situated at the angular position of the balancing vector AV, a corresponding balancing weight can be affixed at this point.

When, however, the wheel disk includes open areas so that no radially continuous wheel disk part exists at the required position of the balancing vector AV, the vector calculator 11 then divides the balancing vector AV into two components K1 and K2, each of which have an angle position that corresponds with a location of a radially continuous wheel disk part represented by 4a and 4b, respectively. An angular distance therebetween could be, for example, α. Referring to the given balancing radius R, the corresponding balancing masses Ma, which can be the same or different from one another, are determined. Depending on the balancing masses Ma determined in this way, appropriate balancing weights are severed from the weight band 8. For this the advancing device 7 is triggered accordingly. Preferably, infinitely variable severing is used so that an exact measuring of the balancing masses is achieved.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method for balancing an unbalance on a motor vehicle wheel including a disk having openings therein defining radially extending, spaced apart supports comprising the steps of:

rotating the wheel and sensing wheel unbalance and determining a balancing mass to correct sensed unbalance and the angular position therefor;

determining angular positions corresponding to the radially extending spaced apart supports and storing such angular positions thereof; and where the desired angular position for a balancing mass lies outside of the spaced apart supports of the wheel disk, the additional steps of dividing the required balancing mass into balancing masses and determining angular positions for the divided balancing masses that correspond to the location of wheel disk supports so that the divided balancing masses are attached in corresponding angular positions on the wheel disk to balance the vehicle wheel.

2. A method as in claim 1, including the additional step of incrementally feeding balancing weight material and cutting an amount therefrom corresponding to the balancing masses.

3. A method as in claim 2, wherein the balancing weight material is in the form of a band.

4. A method as in claim 3 wherein the band is fed from a roll.

5. A wheel balancer for balancing vehicle wheels having wheel disks with openings therein defining disk parts in the form of spaced apart supports, said balancer comprising a rotatably mounted and driven main shaft on which a motor vehicle wheel is fixed, a force measurement system operatively connected with said main shaft, said force measurement system sensing unbalance forces in said main shaft resulting from unbalances in said vehicle wheel and generating signals relating thereto, a rotational angle measurement device operatively coupled with said main shaft, said rotational angle measurement device sensing rotation of said main shaft and of said attached vehicle wheel and generating signals corresponding to the angular positions thereof, an evaluation system, including a plane calculator, being connected to said rotational angle measurement device and said force measurement system and receiving signals from each of said force measurement system and said rotational angle measurement device, said evaluation system determining balancing masses and angular positions therefor, said wheel balancer further including a memory and an angle position sensor connected to said memory and positioned adjacent said vehicle wheel, said angle position sensor generating signals corresponding to the angular location of wheel disk parts, said evaluation device further including a vector calculator operatively connected to receive input signals from said force measurement system, said rotational angle measurement device, said plane calculator and said angle position sensor so that balancing masses can be divided and positioned at unbalance correcting positions on the wheel disk parts.

6. A device as in claim 5, wherein said evaluation system is connected to an advancing device that incrementally feeds and severs weight material corresponding to said balancing masses.

\* \* \* \* \*